PROGRESSIVE TRAFFIC SIGNAL CONTROL SYSTEM

Filed April 7, 1964 8 Sheets-Sheet 1

INVENTORS
J.H. AUER JR., J.P. HUFFMAN
AND T.W. BRADY
BY
Forest B. Hitchcock
THEIR ATTORNEY

PROGRESSIVE TRAFFIC SIGNAL CONTROL SYSTEM

Filed April 7, 1964 8 Sheets-Sheet 2

INVENTORS
J.H.AUER JR., J.P.HUFFMAN AND T.W.BRADY
BY Forest B. Hitchcock
THEIR ATTORNEY INVENTORS
J.H.AUER JR., J.P.HUFFMAN
AND T.W.BRADY
BY Forest B. Hitchcock
THEIR ATTORNEY

PROGRESSIVE TRAFFIC SIGNAL CONTROL SYSTEM

Filed April 7, 1964 8 Sheets-Sheet 5

INVENTORS
J.H. AUER JR., J.P. HUFFMAN AND T.W. BRADY
BY
Forest B. Hitchcock
THEIR ATTORNEY INVENTORS
J.H.AUER JR., J.P.HUFFMAN
AND T.W.BRADY
BY Forest B. Hitchcock
THEIR ATTORNEY

PROGRESSIVE TRAFFIC SIGNAL CONTROL SYSTEM

Filed April 7, 1964 8 Sheets-Sheet 7

INVENTORS
J.H.AUER JR., J.P.HUFFMAN
AND T.W.BRADY
BY
Forest B. Hitchcock
THEIR ATTORNEY INVENTORS
J.H.AUER JR., J.P.HUFFMAN
AND T.W.BRADY
BY
Forest B. Hitchcock
THEIR ATTORNEY United States Patent Office 3,305,828
Patented Feb. 21, 1967

3,305,828

PROGRESSIVE TRAFFIC SIGNAL CONTROL SYSTEM

John H. Auer, Jr., Fairport, and Jerry P. Huffman and Terence W. Brady, Rochester, N.Y., assignors to The General Signal Corporation, Rochester, N.Y., a corporation of New York Filed Apr. 7, 1964, Ser. No. 357,915
19 Claims. (Cl. 340—40)

This invention relates to a control system for traffic signals, and more particularly pertains to such a system comprising a plurality of sections, each section including a number of controlled intersections, and each section capable of operating substantially in an independent mode particularly with respect to offset.

Progressive traffic signal control systems providing for the staggered operation of the successive signals along an artery in order to permit a vehicle traveling along such artery in a predetermined direction and with a predetermined velocity to encounter all green signals are well known in the art. In such systems, it is common to demarcate a signal cycle of predetermined duration which is common for all the signals along the artery, and in some systems the duration of the common signal cycle is made variable in accordance with traffic conditions or in accordance with a time program.

In such prior art progressive signal systems, the start of the signal cycle at any one intersection is delayed by a predetermined amount from the starting time of the signal cycle for the last-encountered signal, and this may be done with all the signals in turn for a progression which favors a particular direction of traffic. The amount of phase shift of the signal cycle from a first-encountered signal to a second-encountered signal along the artery for a given direction of traffic is a function of the distance between such signal locations and the expected velocity of vehicles traveling between those two locations. By empirical means, it is possible to adjust each controller to provide the desired offset so that a favored direction of traffic, moving at an assumed velocity, will ordinarily be permitted to move smoothly along the highway.

The offset which should be in effect at any given time is a function of traffic conditions, being dependent upon which direction of traffic has the predominant flow of traffic thereon, the extent of the difference in traffic flow in the two opposite directions, and the average speed of travel of the traffic. It was at one time thought that only two or three different offsets were adequate: one favoring inbound traffic; the other, outbound traffic; and a third which might be termed an "average" offset which, in effect, was a compromise offset that usually did not particularly favor either direction of traffic over the other but instead sought to provide optimum conditions for both directions of traffic simultaneously and was useful for those conditions, often existing during mid-day, when traffic congestion is light and more nearly equal for the opposite directions.

Further study of traffic conditions on heavily traveled arteries now indicates that it is desirable to provide a system having more than three offsets, and it is now contemplated that as many as six or seven or more different offsets should be capable of being accommodated by the system. Merely as an example, one offset may be designated for that condition wherein traffic is light in both directions; another is provided for relatively light traffic but with one direction of traffic having somewhat greater traffic congestion than the other; still another is provided for that condition wherein traffic is high with respect to congestion levels in both directions but with one direction having a considerably greater amount of traffic than the other, etc.

In very large systems, particularly those involving long arteries having a large number of signal-controlled intersections, an additional problem arises in that traffic conditions at one portion of the artery may be quite different from those existing at some other portion. As one example, at a given time, traffic levels may be quite high with inbound traffic predominating at one place along the artery; whereas, at some other part of the artery, traffic congestion levels may be substantially lower and be about equal in level for the opposite directions. Quite obviously, when the system is arranged to provide a fairly large number of different offsets to take account of a large number of different traffic conditions, the advantages which this might ordinarily provide are lost if the entire system must operate with the same mode despite the difference in conditions existing over different portions of the system. To overcome this, it is contemplated by the present invention that a signal control system for a long artery with a large number of controlled intersections shall be divided into a number of successive sections, with each section including a number of controlled intersections. In each section, traffic conditions are monitored, and an offset is selected which is most favorable to the traffic conditions then existent in that section. In some other section, where traffic conditions may be different, a different offset may be selected, with the result that, in each of the different sections of the system, traffic can be allowed to move most expeditiously because the offset of that section is dependent upon traffic conditions existing in that particular section.

One of the problems that is encountered when a large system is divided into a number of individually controlled sections is that of effecting proper coordination between the adjacent sections. More precisely, the problem is concentrated at the junction of two adjoining sections since the traffic signal at the end of one section will be controlled in accordance with measurements made in its respective section, whereas the immediately adjoining traffic signal for the next section is controlled in accordance with what may be a different set of traffic conditions as measured by the monitoring equipment associated with that section.

One common factor which must, under ordinary conditions, be provided for the system as a whole if there is to be satisfactory signal progression is a common cycle length. Although this cycle length may vary at different times, it is obvious that there can be no predetermined progression between such adjoining sections unless adjoining sections operate with the same cycle length since no phase relationship can be maintained between cycles of unequal duration. In the system of this invention, this is provided by central master apparatus which predetermines a cycle length at any given time for the entire system.

Assuming then that all of the several sections of the system of this invention are operating with the same cycle length as determined by a common central master apparatus, there still exists the problem that, in each of the individual sections of this system, the offset there in effect is determined by local conditions and may be quite different from that in the adjoining section; moreover, the offset in effect in any section may change as traffic conditions change and such change in offset may occur without any references as to whether or not a change in offset is taking place in any other section of the system. The problem, then, resolves itself to one of making necessary adjustments in the time phasing of the signal cycle in one or more sections of the system when there is a change in offset in perhaps only one section since this is the only way that an orderly progression can be maintained for traffic moving from one section to the next along the length of the artery.

Stated briefly, the present invention provides for the control of signals along a long artery which, for signalling purposes, is divided into sections with each section comprising a group of intersection signals. For the entire system, a uniform cycle length is demarcated by central master apparatus, and cycle length data is communicated to section master apparatus associated with each section so that each section master, in turn, can control all the intersection controllers in that section to operate with the established cycle length determined for the system.

One of the section masters is "slaved" directly to the central master, and by this is meant that its signal cycle has a fixed and predetermined phase relationship to the signal cycle demarcated at the central master; in fact, it is entirely practical to have the signal cycle demarcated by this slaved section master in phase coincidence with that generated by the central master. Of course, with respect to the individual intersection controllers of that section, successive controllers will have their signal cycles phase shifted (offset) relative to each other to provide the desired progression, and this can conveniently be accomplished by relating the phase of the signal cycle for each controller to the signal cycle demarcated by the section master. Also, the phase relationship at any or all of the controllers in the section may vary with a change of offset in that section, and this can be accomplished by adjusting the phase at any such controller relative to that of the section master.

Thus far, there has been considered only that particular section which is slaved to the central master. In those sections which lie respectively to either side of and adjoin this first-considered section, similar conditions exist in that each controller in such section may have its signal cycle referenced to a signal cycle demarcated by its own section master and with any of several possible phase relationships being possible dependent upon which offset is then in effect in such section.

If an orderly progression is to exist between the aforementioned "first" section, and a section adjacent to it, and if it is remembered that the signal cycle at the controller for either end of such first section may assume any of several phase relationships relative to its section master dependent upon the offset in effect, it is necessary that such adjacent section master must demarcate a cycle whose phase is always referenced to the signal cycle currently being demarcated at the nearest end controller of the adjoining first section. If this is done, then any phase shift in the signal cycle of the endmost controller of the first section must produce a phase shift in the cycle demarcated by the adjoining section master, and consequently also a phase shift in the individual controllers of such adjoining section since they are all referenced to such section master. As a result, the controller of such adjoining section which is the one next encountered by traffic moving out of the first section, can always have a desired phase relationship of its signal cycle relative to that demarcated at the last-encountered controller so that traffic can flow smoothly between the sections.

This feature of maintaining the offset between successive controllers which are respectively in adjoining sections can be had not only when there is a change in offset in the first section but also when the offset change is in the adjoining section. The reason for this is that the relative phase relationships between the several controllers in such adjacent section are all governed by referencing each controller to the section master, which section master is, in turn, governed with respect to its phase relationships by the then-existing phase relationships of the endmost controller of the first section.

The above-mentioned principles of operation and construction of the present invention thus far set forth apply equally regardless of how many sections are in the system.

In a practical system, one section is chosen to be slaved to the central master, and the one selected is ordinarily that one which is geographically closest to the central master apparatus in order to reduce the amount of communication channels required. With respect to the section adjoining such slaved section master to either side, the foregoing description applies. With respect to still additional section masters, each outlying section master is, in a similar manner, slaved to that section master which lies between it and the particular aforementioned section master which is slaved to the central master.

It is, accordingly, an object of this invention to provide a signal system appropriate to the control of a large number of signals, which system is divided into a plurality of sections in each of which a different offset may be in effect at any given time, and to provide this flexibility in offset while at the same time providing that there shall be a proper offset maintained between adjoining signals associated, respectively, with different sections.

Other objects, purposes, and characteristic features of this invention will appear as the description thereof progresses.

In referring to the drawings:

FIGS. 1A and 1B, when placed side by side, comprise a block diagram illustrating the relationship between the central master, the several section masters associated therewith, and a plurality of individual intersection controllers of the system;

FIGS. 2A–2D, when arranged in the manner shown in FIG. 3, illustrate in greater detail the organization of the invention showing in particular a typical section master and a pair of adjoining controllers associated respectively with adjoining section masters;

Figure 1A:
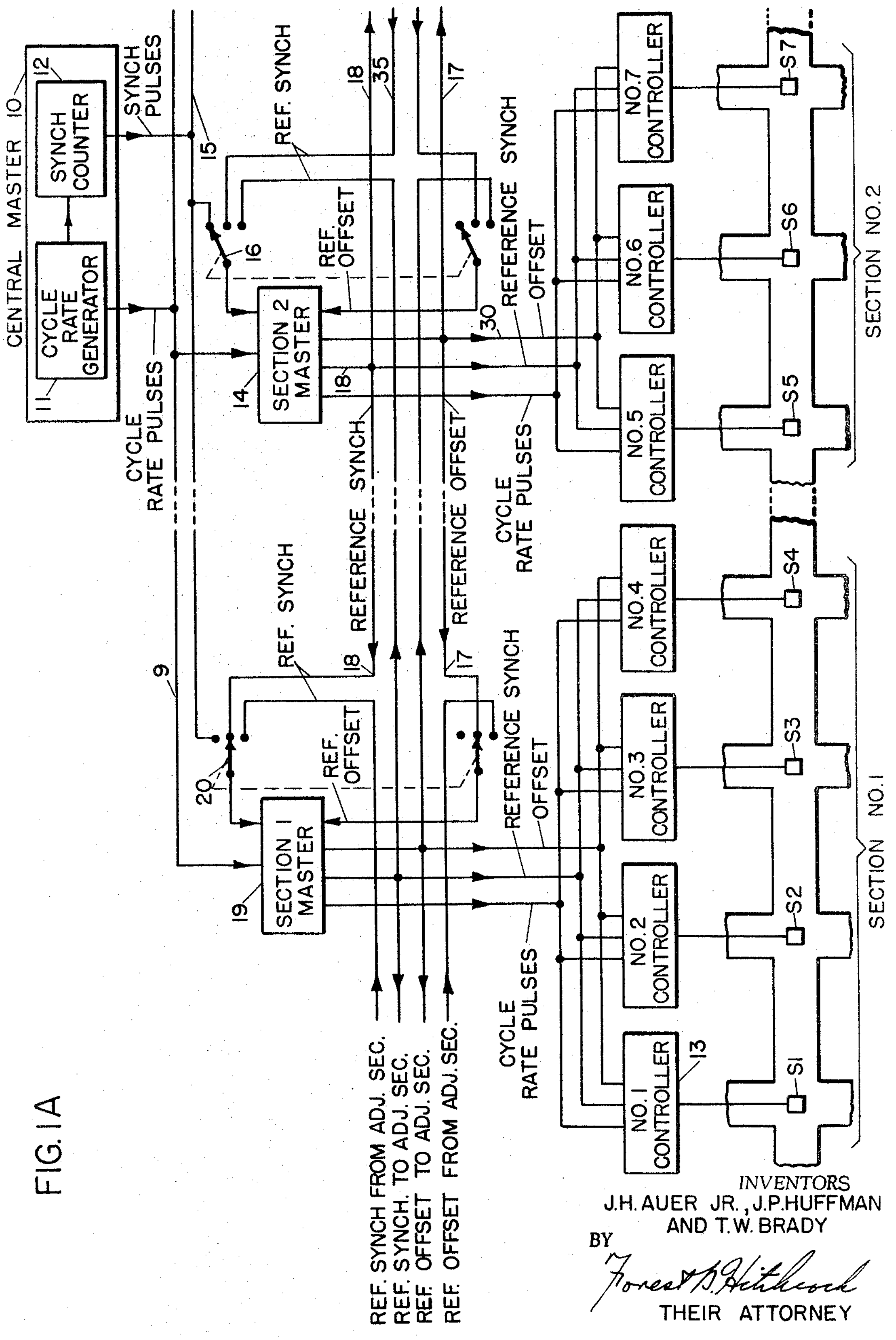
Figure 1B:
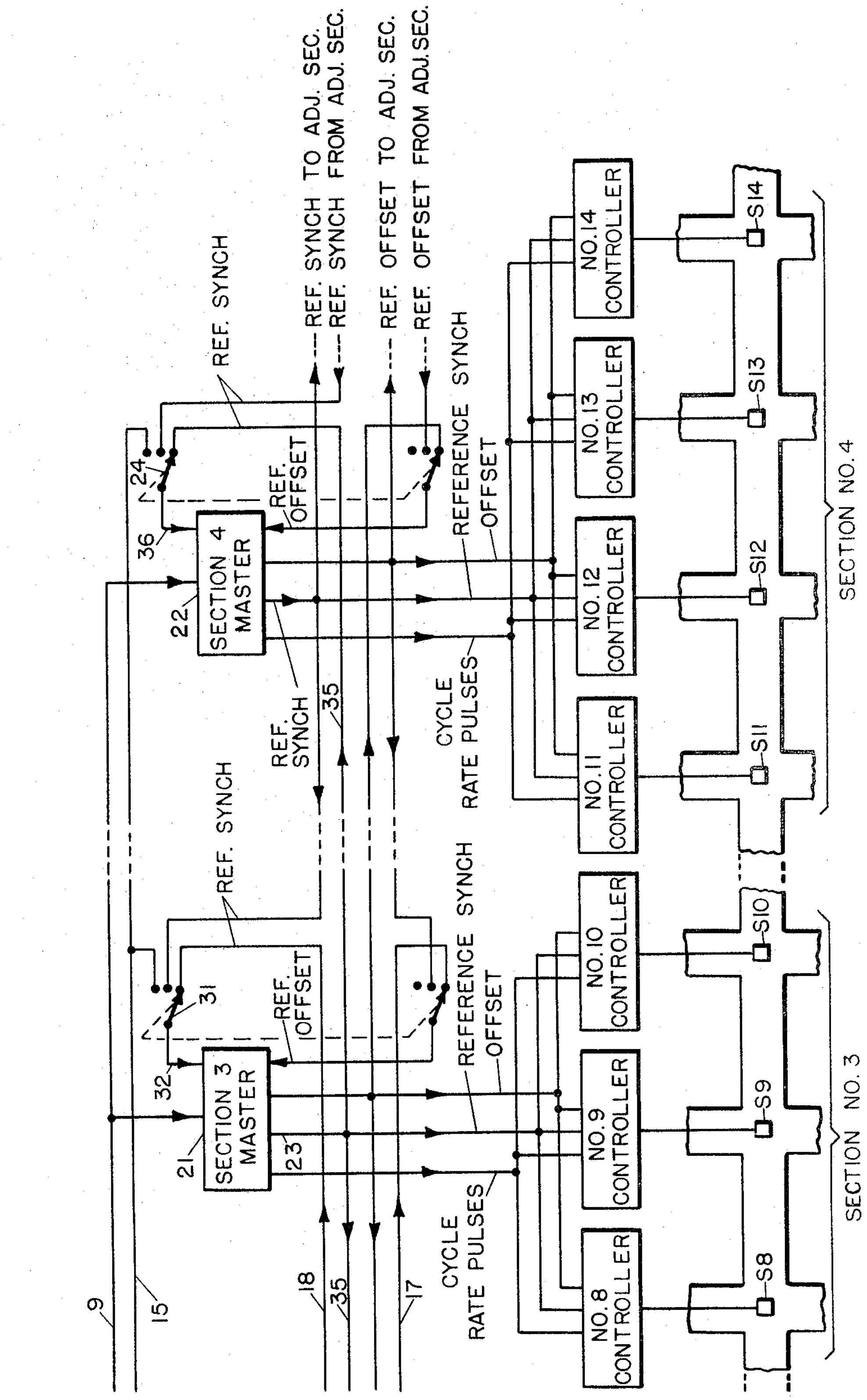

Referring first to FIGS. 1A and 1B, a Central Master 10 is illustrated which includes a cycle rate generator 11 and synch counter 12. The function of the cycle rate generator 11 is to generate repetitive pulses which may be considered "clock" pulses for the entire system. These cycle rate pulses are applied to the synch counter 12 which counts the cycle rate pulses and, each predetermined group thereof, generates a special synch pulse demarcating the limits of the signal cycle.

More specifically, it is contemplated that 50 cycle rate pulses provided by cycle rate generator 11 will constitute one signal cycle; thus, the synch counter 12 is so organized that for each 50 pulses applied to it, it will produce one synch pulse.

Although no external control is shown over the rate of generation of the cycle rate pulses in FIGS. 1A and 1B, it is evident that the rate at which these pulses are generated determines the signal cycle length, and in a practical system, it may well be desirable to control cycle length in accordance with any one or more numerous factors such as the measured amount of traffic, time of day, etc. In the co-pending application of John H. Auer, Jr., Seral No. 306,036, filed September 3, 1963, there is shown a system wherein the cycle length is made dependent upon a number of different parameters, and it will be evident to one skilled in the art how the teachings of the copending application may be applied to control cycle length in the system of this invention.

FIGS. 1A and 1B also illustrate a section of artery having a number of intersecting cross streets, at each of which a traffic signal S1–S14 is provided. Each of these signals is illustrated diagrammatically as being controlled by a signal controller such as, for example, the number one controller 13 associated with signal S1. FIGS. 1A and 1B further illustrate that the system is divided into a number of semi-independent sections such as the section which is related to signals S1–S4 and is designated as Section No. 1 and a similar Section No. 3, for example, which includes the traffic signals S8–S10.

The signal controllers included within any one section are all connected to a respective section master. For example, signal controllers 5 through 7 are connected to the Section No. 2 Master 14 from which it receives cycles rate pulses, offset information, and the reference synch whose function will later be set forth.

A selected one of the section masters is slaved to the Central Master 10, and in FIGS. 1A and 1B it is the No. 2 Section Master which is shown as being connected directly to the Central Master 10. Thus, cycle rate pulses which are generated by cycle rate generator 11 are applied over lead 9 to each section master and are there counted by a cyclical counter which demarcates a signal cycle for each counting cycle. However, synch counter 12 in the central master 10 apparatus provides synch pulses over lead 15, through switch contact 16 in the uppermost of its three positions, only to the Section 2 Master 14. Thus, as will appear later, the signal cycle period demarcated by the Section 2 Master 14 has a predetermined and fixed phase relationship with respect to the signal cycle demarcated at the Central Master 10, and for purposes of convenience it is generally provided that the two signal cycles thus demarcated will be in exact phase coincidence.

Each section master includes a counter which counts the cycle rate pulses aplied to it, and, once for each full cycle of counting, it produces an output synch pulse which, in the case of the Section 2 Master 14, appears on the output bus 18 over which it is applied to fixed switch point contacts associated with both the Section 1 and Section 3 Masters, respectively. In the case of the Section 1 Master 19, which is slaved to the Section 2 Master, the three-position switch 20 is in its central position so that it receives the reference synch pulse appearing on bus 18. In the case of the Section 3 Master, its three-position switch is in its lowermost position so that it also receives the reference synch pulses apearing on bus 18. What this means is that each time that the counter in the Section 2 Master has completed a cycle of counting and has produced a synch pulse which apears on bus 18, this synch pulse is made available to the counters in both the Section 1 Master and the Section 3 Master and can be used there to set a similar counter of each such section master to any predetermined count; thus, any desired phase relationship may be obtained between the counters in the Section 1 and Section 3 Masters relative to the counter in the Section 2 Master.

A similar situation exists with respect to the Section 4 Master 22 which, in effect, is slaved to the Section 3 Master 21. In other words, a reference synch output pulse appears on wire 23 and is provided by the counter in this section master each time that it has completed the counting of a full complement of cycle rate pulses from Central Master 10. Since the three-position switch 24 associated with Section 4 Master 22 is in the lowermost if its three contact positions, the Section 4 Master receives its reference synch pulse from the Section 3 Master and thus assumes a predetermined phase relationship of its counter with respect to the corresponding counter in in the Section 3 Master.

It will be apparent from the switching arrangement which is provided in relation to each of the section masters, that any one of the section masters in the system may be made directly dependent upon the central master 10 rather than merely the Section 2 Master as illustrated in FIGS. 1A and 1B. Thus, assuming that the Section 3 Master were so slaved directly to Central Master 10, then the Section 2 Master 14 would be slaved to the Section 3 Master 21, and the Section 1 Master 19 would then again be slaved to the Section 2 Master 14. In an analogous manner, the Section 4 Master 22 would be slaved to Section 3 Master 21.

As will later appear, each section master includes apparatus which is responsive to a plurality of parameters and determines the particular offset which will, at any given time, be most expedient for traffic flow in that section. As shown in FIGS. 1A and 1B, each section master is provided with an output lead which extends to each of the local intersection controllers to provide each with offset data, thereby making it possible for the local controller to determine at any time what phase offset its signal cycle should have with respect to the signal cycle then being demarcated at its section master. Such connection is illustrated diagrammatically with reference to the Section 2 Master by lead 30 which extends from this section master to the Nos. 5–7 local intersection controllers.

Obviously, the amount by which the signal cycle demarcated by any local controller is phase-displaced or offset from the signal cycle demarcated by the respective section master is determined by which of the several available offsets is at any time in effect in that section. In other words, the particular offset determined at any one time establishes the amount of the phase relationship or offset between the respective signal cycles between the successive Nos. 5–7 local intersection controllers of Section 2. However, irrespective of which of the available offsets is in effect at any time in Section 3, it is obvious that consideration must be given to the phase relationship existing between the signal cycles for the Nos. 7 and 8 controllers, the first of which is in Section 2 but the second of which is in the adjoining Section 3. Whereas the offset between the signal cycles for the Nos. 8–10 controllers is determined by the particular offset established at any time by the Section 3 Master, it is obviously impossible to select an offset for the Section 2 Master and, independently, an offset for the Section 3 Master without at the same time recognizing that an orderly flow of traffic can occur between the No. 7 and No. 8 intersections only provided that at all times a suitable offset is provided between the No. 7 and No. 8 controllers.

As previously mentioned, FIGS. 1A and 1B shown that the Section 3 Master is, in effect, slaved to the Section 2 Master. Since the time of occurence of the signal cycle for the No. 7 controller is entirely dependent upon which of the several offsets is in effect in Section 2, it is evident that any change in offset in Section 2 ordinarily results in a phase displacement for the signal cycles of all the intersection controllers in Section 3 even though there may be no change in offset in Section 3 itself since, only in this way can an orderly transition be maintained between the adjacent controllers in the two adjoining sections, controllers Nos. 7 and 8.

To accomplish this purpose, the Section 3 Master generates a signal cycle which is at all times referenced to that then existing at the No. 7 controller in Section 2. Again, for purposes of convenience, it is preferred that the signal cycle demarcated at the Section 3 Master be in phase coincidence with that of the No. 7 controller, the endmost controller of Section 2. From what has previously been stated, it is apparent that the signal cycles for the Nos. 8–10 controllers in Section 3 are all phase-oriented with respect to the signal cycle generated by the Section 3 Master in accordance with the particular offset then predetermined for Section 3.

The overall result then is that any change in offset for Section 2 that results in a shift in phase of the signal cycle for the No. 7 controller, the last controller in Section 2 and the one nearest to Section 3, results in a shift in phase of the signal cycle demarcated by the Section 3 Master, and this, in turn, then phase shifts the signal cycles demarcated by each of the local intersection controllers as well as by an amount determined by the shift in phase experienced at the Section 3 Master.

This eventually results in a phase shift in the signal cycle demarcated by the No. 10 controller which is the last controller in Section 3 and the one most closely adjacent to Section 4. As before, this must then result in a shift in phase of the signal cycle demarcated in the Section 4 Master, with resulting changes in phase of the signal cycles demarcated by the several intersection controllers of Section 4.

The same general mode of operation occurs also with respect to Section 1. Thus, any shift in phase of the signal cycle demarcated by the No. 5 controller (the endmost controller of Section 2 nearest to Section 1) results in a phase shift in the signal cycle demarcated by the Section 1 Master, and then this phase shifts the signal cycle demarcated by each of the local intersections controllers Nos. 1–4 of Section 1.

Since each section master is thus, in effect, slaved to an intersection controller in an adjoining section, except for one section master which is slaved directly to the central master, one way in which this could be accomplished would be to provide connections directly between each slaved section master and the particular intersection controller to which it is slaved. This, however, is ordinarily not a practical arrangement. A plurality of wires extend between any section master and the several controllers associated therewith, but it is not economical to extend line wires from a controller in one section to a section master for a different section. Accordingly, a feature of this invention is that of slaving a section master to the intersection controller of an adjoining section without requiring that there be any direct transfer of data between the two to effect the synchronization.

Referring to FIGS. 1A and 1B again, a brief description will now be given of the manner in which the Section 3 Master is, in effect, synchronized to the No. 7 intersection controller of Section 2. The Section 2 Master is provided, as previously mentioned, with an output over bus 18 constituting reference synch pulses, i.e. a pulse which represents the point of demarcation between successive cycles counted off by the counter in the Section 2 Master in response to cycle rate pulses received from Central Master 10. Associated with the Section 3 Master is a three-position switch 31 which is in the lowermost of its three contact positions and thus routes the reference synch pulses appearing on bus 18 to the reference synch input lead 32 of the Section 3 Master. Because of this connection, a pulse appears on the input lead 32 each time that the counter in the Section 2 Master, which counts off the cycle rate pulses provided by the central master, goes through its zero position, thereby indicating the start of a new counting cycle.

Such synch pulses applied to the Section 3 Master are not, however, used to reset the cycle rate counter in such Section 3 Master to the zero condition for this would place that counter in direct phase synchronism with the corresponding counter in the Section 2 Master. Instead, the Section 3 Master is provided additionally with information from the Section 2 Master which indicates which of the particular available offsets is then in effect throughout Section 2. This latter information then immediately, although indirectly, provides information as to what must be the then-existing phase relationship of the counter in the No. 7 controller relative to the counter in the Section 2 Master. Provided with this information, the Section 3 Master can, upon the reception of the reference synch pulse it receives from Section 2, readily cause the counter in such Section 3 Master to operate to a count which places it in exact synchronism with the counter in the No. 7 controller. Moreover, upon any change in offset in Section 2, resulting from a change in the measured traffic conditions in such section and producing a phase change in the counter of the No. 7 controller, information as to the new offset then in effect is immediately transmitted to the Section 3 Master so that it can immediately shift to a new phase relationship relative to the counter of the Section 2 Master enabling it to stay in exact synchronism with the counter in the No. 7 controller.

From the description given thus far, it can readily be seen that, once the counter in the Section 3 Master has been phase shifted because of a change in offset of Section 2, that the counters in each of the controllers Nos. 8, 9, and 10 will ordinarily shift in phase since all are referenced to the counter in the Section 3 Master, and this will have occurred entirely as a result of the change in offset information which the Section 3 Master received from the Section 2 Master.

Because of the shift in phase occurring at the No. 10 controller (the endmost controller in Section 3 and the one nearest Section 4), there must now also be a shift in phase of all the controllers in Section 4 if there is to be a smooth transition between controllers Nos. 10 and 11. This is brought about by shifting the phase of the counter in the Section 4 Master to bring it into phase coincidence with the cycle counter at the No. 10 controller. This phase shift in the Section 4 Master occurs as a result of a phase shift which has occurred in the reference synch pulses supplied by the Section 3 Master over lead 35 to the Section 4 Master, to three-position contact switch 24, and thence to input lead 36 of the Section 4 Master. The phase shift of the reference synch pulses will, of course, have occurred in response to the shift in phase of the counter in the Section 3 Master since, it will be remembered, such counter produces a reference synch pulse each time it reaches the zero count. The phase of the counter in the Section 4 Master will then change and this will then phase shift all the counters in each of the local intersection controllers Nos. 11 through 14.

Described briefly, then, all section masters in the system are driven from the central master in that they all receive cycle rate pulses from the central master and are thus all driven at the same rate. However, only one of the section masters has its phasing determined directly by the central master, and this is accomplished by providing it with synch pulses from the synch counter in the central master. The remaining section masters in the system are each slaved to an intersection controller in an adjoining section so that, as in the typical arrangement of FIGS. 1A and 1B, the Section 3 Master is synchronized indirectly with the No. 7 controller which represents that controller in Section 2 which is the endmost controller in Section 2 nearest to Section 3, and the Section 1 Master is synchronized to the No. 5 controller of Section 2, which represents that particular controller in Section 2 which is at that end of Section 2 nearest to Section 1. Synchronization of any section master to the controller of an adjoining section is accomplished by receiving reference synch pulses from the adjoining section master and also receiving offset information from that adjoining section master. The reference synch pulses establish the phase of the cycle counter at the adjoining section master, and the offset information establishes what phase relationship must then be in existence between such cycle counter and the similar counter in the end controller; from this combined data, it is readily possible to control the cycle counter in the adjoining section master so that it will be in phase coincidence with the counter in such end controller.

In practice, it is generally more practical to select that section master which is closest to the central master as the one which will be slaved directly to the central master. The remaining section masters are then effectively slaved "outwardly" from that selected section master in the manner indicated in FIGS. 1A and 1B.

Refering to FIGS. 2A–2D, the Section 2 Master is again shown in block diagram, but the Section 3 Master is now cshown in greater detail. In addition, the details of a typical intersection controller, the No. 7 controller, are shown, and this, as can be seen from FIGS. 1A and 1B, is a controller which is included in Section 2. A similar intersection controller, the No. 8 controller, is also shown, and this controller is included within Section 3. Thus, these FIGURES 2A–2D show that portion of the system of the invention which best illustrates the features whereby proper coordination is maintained between adjacent intersection controllers which are respectively in different sections.

Figures 5, 6:
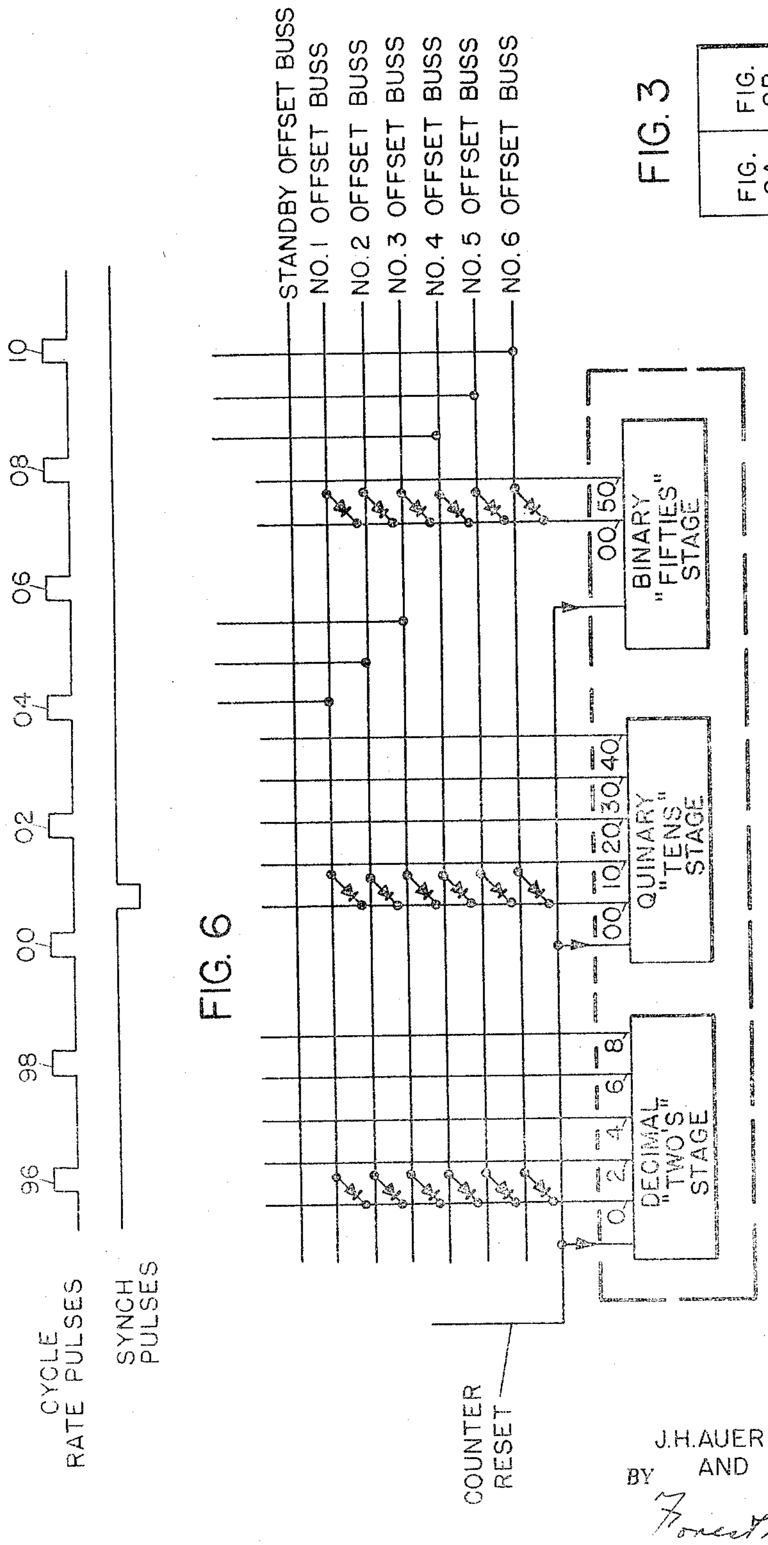
FIG. 5 is a time wave diagram illustrating the composition of a typical signal cycle.
FIG. 6 is a portion of a typical controller.

As in FIGS. 1A and 1B, cycle rate pulses and synch pulses are being shown as applied over line wires to each of the section masters. With respect to the Section 3 Master shown in detail, the cycle rate pulses are applied to a synch counter 40 which is preferably a cyclic type of electronic counter advancing one step for every discrete input pulse applied thereto. As illustrated in FIG. 5, a complete signal cycle constitutes 50 dicrete cycle rate pulses which, for purposes of convenience, are even numbered from 00 to 98 to facilitate reference to particular percentage points in a cycle. As is also shown in FIG. 5, a synch pulse occurs each cycle directly after the 00 pulse and before the 02 pulse, thereby demarcating the boundaries of each signal cycle.

Since 50 cycle rate pulses are included within any one signal cycle, the full complement of such pulses may be counted by a synch counter having a five-stage units counter 41 for counting the five pulses in any group of ten, plus a tens counter 42 for counting the number of such groups of five. Thus, these two counters 41 and 42 together are capable of assuming a different condition in response to each of the 50 cycle rate pulses occurring in a cycle.

For example, at the end of the 04 cycle rate pulse (the second pulse in the cycle), energy will appear on the No. 4 output wire of counter 41, and energy will simultaneously appear on the No. 00 output wire of counter 42 since it will not yet have been advanced by a pulse received from counter 41. As another example, at the end of cycle rate pulse 36, energy will appear only on the No. 6 output wire of counter 41, but since this counter will have gone through its complete counting cycle three times, the ten-position counter 42 will have advanced from zero to three so that energy will appear on the No. 3 output wire.

The Section 2 Master 14 includes a synch counter exactly like the synch counter 40 of the Section 3 Master, and it, too, receives cycle rate pulses from the central master. The same is true of every other section master in the system.

Although the cycle rate pulses determine the stepping rate of the synch counter for each section master, they do not establish any predetermined phase relationship between the counters in the several respective section masters. Such phase relationship is determined by applying a reference synch pulse to each section master from one of several sources and using such reference synch pulse to set the synch counter to a particular count.

Figure 2A:
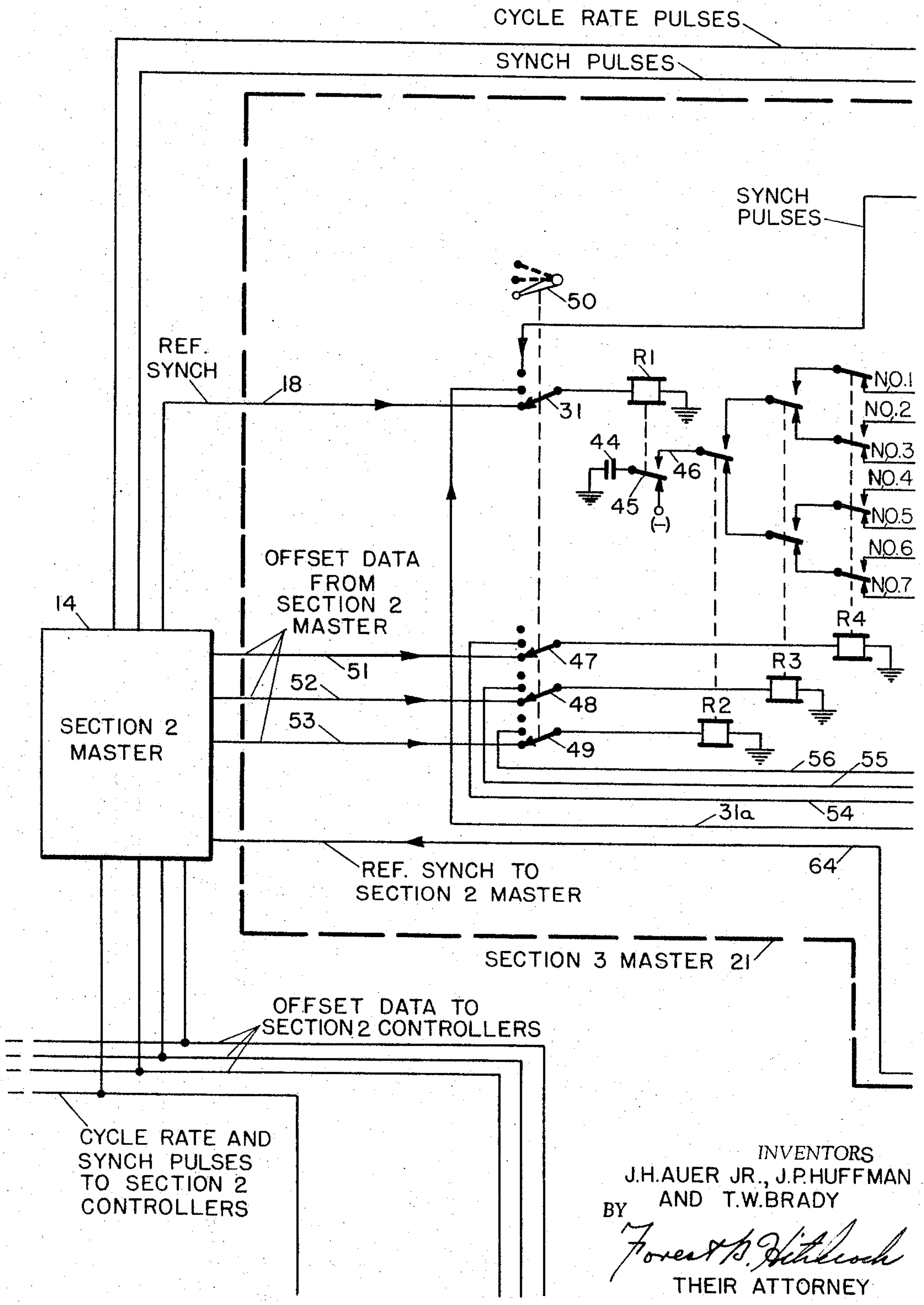

As previously described in connection with FIGS. 1A and 1B, the Section 3 Master receives its reference synch pulse from the Section 2 Master. This is shown in FIG. 2A by the connection of bus 18 from the Section 2 Master to the lowermost of the three fixed contact points associated with switch lever 31. Thus, as will later be described in connection with the description of the Section 3 Master, each time that the synch counter of the Section 2 Master reaches the 00 state, a pulse of energy appears on bus 18 and is applied to switch contact 31 to energize relay R1. If switch contact 31 were in its center position, relay R1 would instead be energized by the reference synch pulses appearing on lead 31a and extending from the adjacent Section Master 4.

When relay R1 picks up, a circuit is completed from ground, through capacitor 44, and through front contact 45 of relay R1, to wire 46. Previously, when relay R1 was dropped away, capacitor 44 was charged between the (−) terminal and ground, but now that relay R1 has picked up, capacitor 44 discharges, and the route of the discharging current is dependent entirely upon the actuated conditions of relays R2, R3, and R4.

The actuated conditions of these latter relays are, in turn, dependent upon the particular offset information then being received and applied to the Section 3 Master from one of the adjoining section masters. According to what has already been described in connection with FIGS. 1A and 1B, the Section 3 Master, being slaved to the Section 2 Master, must receive offset information from the Section 2 Master as well as the reference synch pulses. For this reason, the circuit of switch contacts 47, 48, and 49 in FIGS. 2A and 2B (all of which are ganged together with contact 43 and operated in unison by a switch lever 50), are such that the energization of relays R2–R4 is dependent upon the selective energization of wires 51, 52, and 53, all of which are connected to the Section 2 Master. If switch contacts 47, 48, and 49 were in their central positions instead, the actuated conditions of relays R2–R4 would then depend upon the selective energization of wires 54, 55, and 56 which are respectively energized in accordance with the offset information obtained from the Section 4 Master.

Figure 2B:
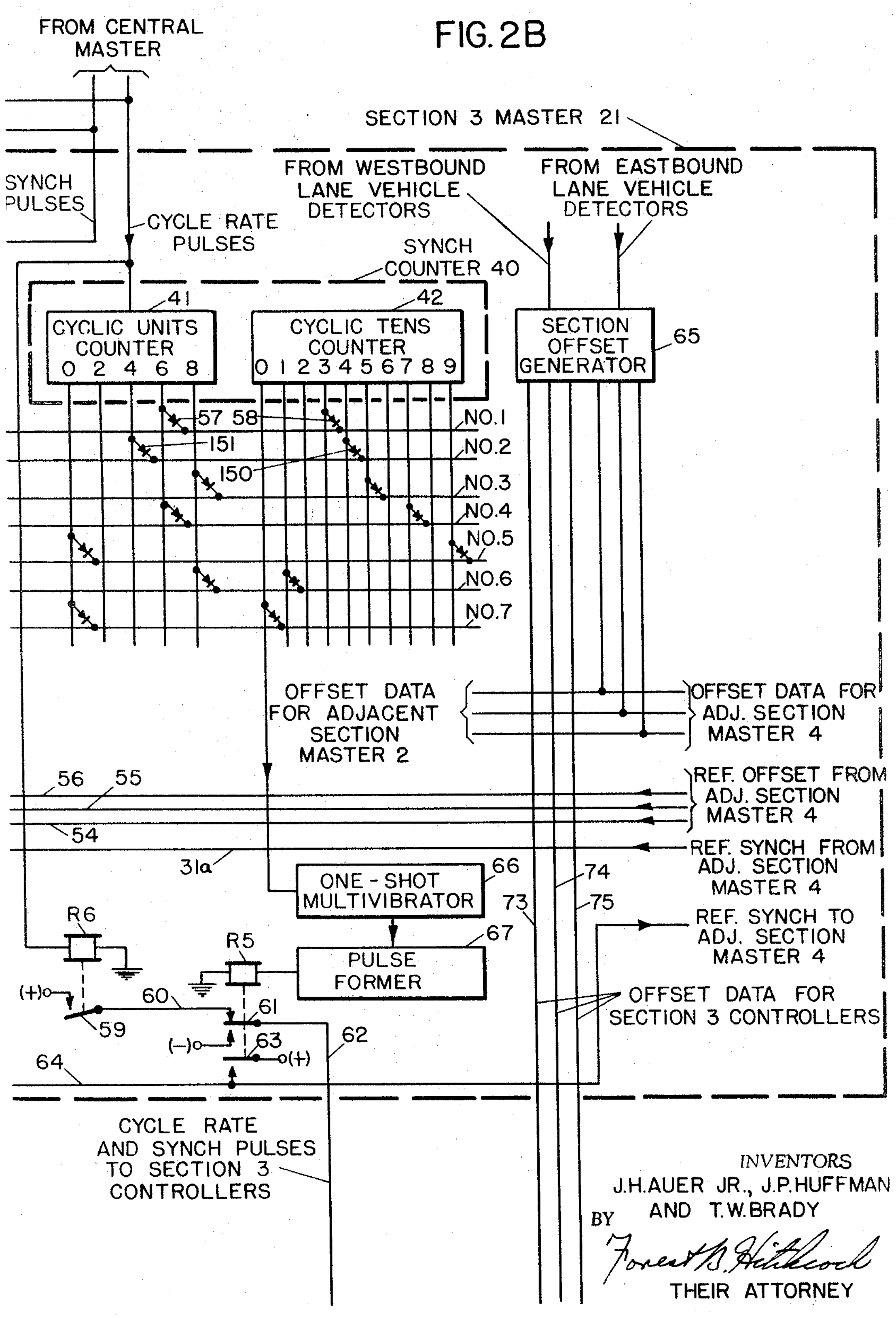

The offset information which is derived from any one section master and made available to the section masters to either side is in the form of a selective energization of three wires such as wires 51–53; and this means that a selective energization of three relays such as relays R2–R4 occurs. As illustrated in FIGS. 2A and 2B, a fan of relay contacts of these relays R2–R4 is provided so that the discharge current of capacitor 44 resulting when relay R1 picks up applies a voltage pulse to any one of six buses designated Nos. 1 through 6 in FIG. 2B, each corresponding to a different one of six available offsets for Section 2.

Incidentally, it will be noted that if none of the relays R2–R4 is picked up, the energy resulting from the picking up of relay R1 places a voltage pulse on an additional bus designated No. 7. From the preceding description, it will be remembered that the particular section master which is slaved directly to the central master need not receive offset information from any adjoining section master, and FIG. 2A shows that when any section master is thus designated and its manually operated switch 50 is placed in the uppermost position, none of the relays R2–R4 is energized. Consequently, such section master will always have its No. 7 bus energized upon the picking up of relay R1 as each synch pulse arrives. However, for all other section masters, such as Section Masters 1, 3 and 4 of FIGS. 1A and 1B, one or a combination of the relays R2–R4 of such section master is at any one time energized, thereby resulting in the energization of one of the buses Nos. 1 through 6 upon each occurrence of a synch pulse from the adjoining section master to which it is slaved and that this momentarily picks up relay R1 in that section master and places a voltage pulse on one of the buses Nos. 1–6.

Figure 4:
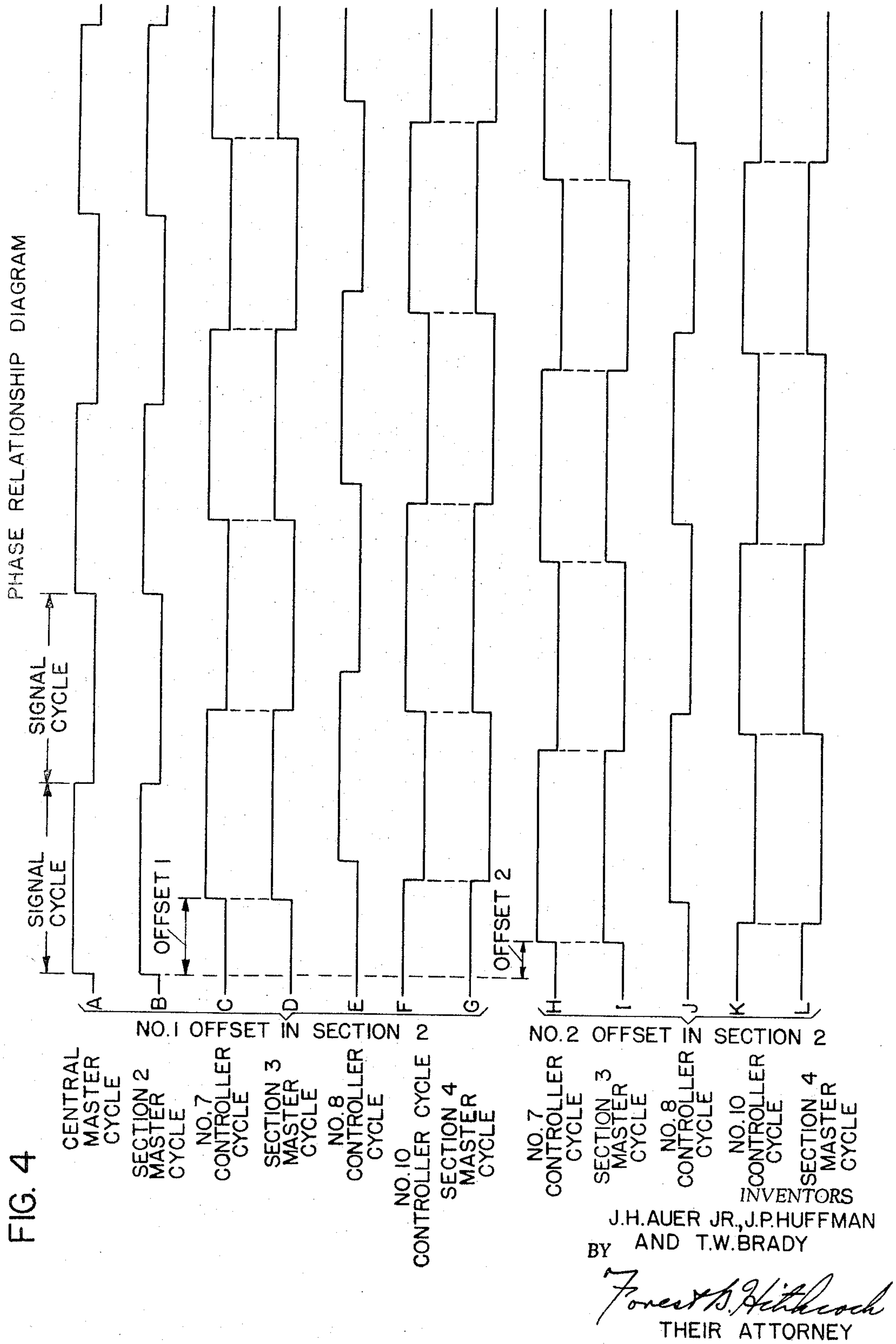
FIG. 4 is a phase relationship diagram illustrating the mode of operation of the invention.

FIG. 4 shows that the synch pulse arrives just before what is considered to be the first or 02 cycle rate pulse. Since each synch pulse has the effect of energizing one of the buses Nos. 1–7 associated with the synch counter 40, it is evident that such pulse may set the synch counter 40 to any predetermined count dependent entirely upon the connections in the diode matrix connecting these buses to the various count buses extending from the units and tens counters 41 and 42. For example, if relay R2 is picked up, relay R3 is picked up, but relay R4 is dropped away in accordance with the offset data received from Section 2, then the momentary picking up of relay R1 in response to the reference synch pulse also received from Section 2 will place a negative voltage pulse upon the No. 1 bus, and this negative pulse will be applied through diode 57 to the No. 6 step of counter 41 and simultaneously through diode 58 to the No. 3 step of counter 42. In other words, if the Section 2 Master establishes an offset for Section 2 whose equivalent code on wires 51, 52 and 53 results in the energization of wires 53 and 52, but the deenergization of wire 51, then synch counter 40 will be forcibly set to the count of 36 each time a reference synch pulse is received over lead 18 from the Section 2 Master. For any different offset selection in effect in Section 2, a different code is made available to the Section 3 Master over wires 51–53, resulting in the energization of a different one of the buses, so that synch counter 40 is set to a different count upon the occurrence of a reference synch pulse from the Section 2 Master.

Under almost all circumstances, if there is no change in offset in Section 2, the full complement of 50 cycle rate pulses from the central master will continually return synch counter 40 in Section Master 3 to the same condition or count just prior to the time that a reference synch pulse is obtained from the Section 2 Master, because of the cyclical nature of the counter. Of course, if there were any error in counting by the synch counter 40, such error would immediately be corrected upon the arrival of the reference synch pulse from Section 2. However, the primary function of making possible a re-setting of the synch counter 40 once each cycle is to enable it to be reset to some different condition if, since the last reference synch pulse was received from the Section 2 Master, there has been a change in offset in Section 2.

Before considering in greater detail the problems which arises in effecting an orderly transition in offsets between adjoining intersection controllers which are respectively in adjacent sections, it is deemed expedient to describe first how any one intersection controller is operated in response to its section master. Referring to FIG. 2B, a one-shot multivibrator 66 is shown which receives an input from the zero step output lead of tens counter 42 in synch counter 40. Thus, this multivibrator 66 receives an input each time that the tens counter 42 reverts to its zero state which is of course, at the beginning of each signal cycle demarcated by the synch counter 40. In other words, the one-shot multivibrator 66 is operated from its normal condition to its astable state at the very beginning of each cycle demarcated by counter 40, and this multivibrator is so constructed that it remains in its astable state for only a brief length of time. However, when the multivibrator 66 returns to its normal condition, it provides a trigger pulse to pulse former 67 which, in turn, provides a pulse of uniform length for deenergizing relay R5 for a predetermined interval whose length is determined by the desired length of the synch pulse to be transmitted to each of the controllers in the related Section 3.

The Section 3 Master also includes a relay R6 which is energized directly by the cycle rate pulses obtained from the central master. Consequently, for each such cycle rate pulse, relay R6 picks up momentarily and closes its front contact 59, thereby causing energy to be applied from (+) and through the closed front contact 59, to wire 60. Under ordinary circumstances, when no synch pulse is occurring, relay R5 remains picked up and its front contact 61 remains closed. Therefore, the repetitive pulsing action of relay R6 causes repetitive voltage pulses to appear on bus 62 and thence to each controller in Section 3. Once for each cycle, however, upon the occurrence of the synch pulse, relay R5 drops away and closes its back contact 61 and this causes bus 62 to instead be connected through back contact 61 to the (−) terminal, thereby causing a negative-going synch pulse to be interspersed between two positive-going cycle rate pulses. Thus, the overall effect is that of applying to wire 62 and to each controller in the section, a series of 50 cycle rate pulses, each of positive polarity and predetermined duration, and with one negative-going synch pulse also appearing on wire 62 for each 50 cycle rate pulses.

Relay R5 is provided with an additional contact 63 which is normally open but is also closed at the time of a synch pulse so as to apply positive energy to wire 64. The purpose of this is to provide reference synch pulses for use by either or both of the adjoining section masters, so that either may be slaved to the Section 3 Master.

Another function of each section master is that of determining which offset shall be in effect in that section and making this information available not only to adjoining section masters but also to each controller in that section. In FIG. 2B, this apparatus is exemplified by a block designated Section Offset Generator 65. Appropriate legends indicate that this offset generator receives information from vehicle detectors for both the westbound and eastbound lanes of the artery. The manner in which a preferred offset is computed in accordance with traffiic measurements does not constitute a part of this invention but reference may be made to the co-pending application of Auer and Ross Serial No. 305,967, filed September 3, 1963, which discloses in detail one manner in which any one of a number of different offsets may be selected in accordance with measured traffic conditions. In any event, the Section Offset Generator 65 in FIG. 2B is representative of such equipment and is shown as selectively energizing two sets of output leads, each including three wires. Each set of output wires carries the information as to the offset then in effect, but each codes the information in a somewhat different manner for reasons to be explained later.

From the description given thus far, it is evident that offset data when provided to an adjacent section master is used to selectively energize relays such as R2–R4 of FIG. 2A, and the code used may be one wherein one or more of the three relays are energized at any time, whereby the resulting selective energization of the relays is capable of energizing one of six buses designated Nos. 1 through 6 in FIG. 2B. However, when the offset information is directed to each of the local intersection controller in any section from it corresponding section master, it is then preferable to use a code in which either positive or negative polarity of energization appears on only a selected one of three wires. The reason for this is that it is preferable to provide local intersection controllers which are of a type employing substantially only solid-state components. This makes it desirable to use what has been termed a "polarity shift receiver," one of which is connected to each of the wires bearing offset data from the section master and has two output wires with one or the other energized in accordance with the polarity of the input signal applied to that particular polarity shift receiver on its single input lead.

Figure 2C:
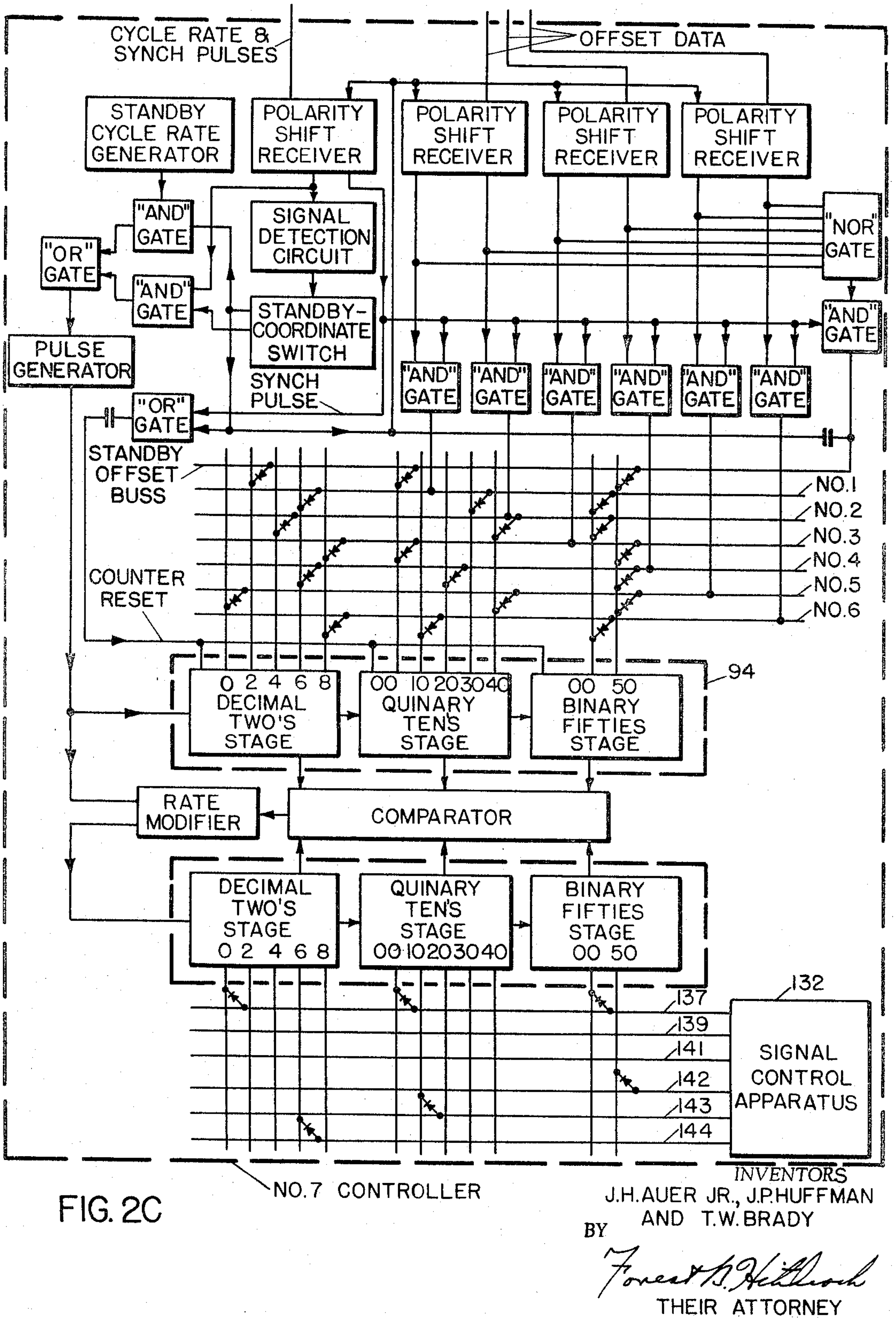
Figure 2D:
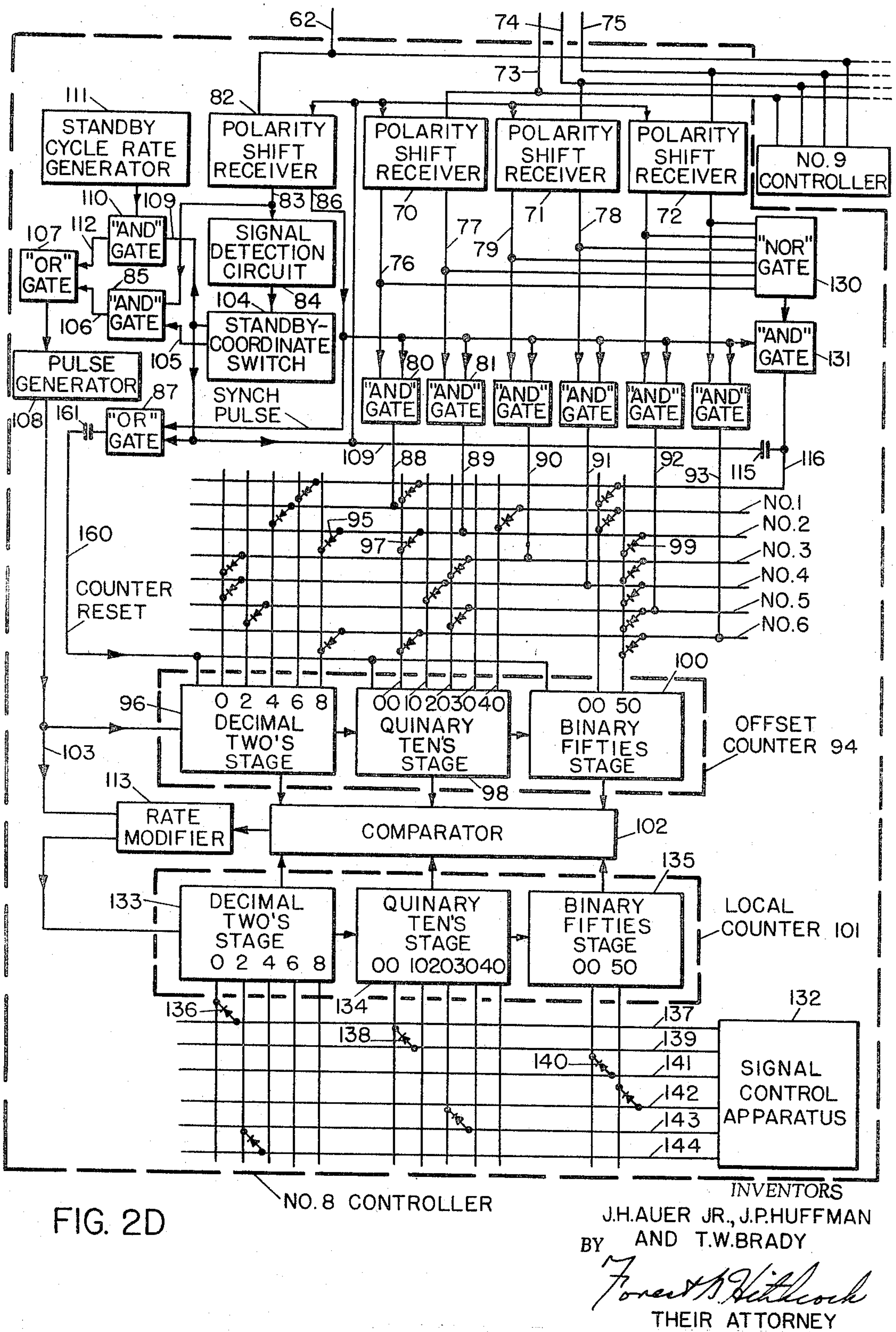
Figure 3:
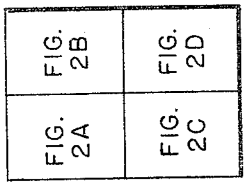

Thus, referring to FIG. 2D, a typical intersection controller, the No. 8 controller, is shown as including three polarity shift receivers 70, 71, and 72. These are selectively connected to wires 73, 74, and 75 which extend from the Section Offset Generator 65 of FIG. 2B. For one particular selection of offset as determined by the Offset Generator 65, it may be assumed that positive energization appears on wire 73 and no energization appears on either wires 74 or 75. With respect to polarity shift receiver 70, its output lead 76 will then be energized whereas its output lead 77 will be deenergized, and this comes about because of the fact that the single input lead to this polarity shift receiver 70 was energized with a positive polarity of energization. Both polarity shift receivers 71 and 72 provide no energization on either of their output leads because of the absence of energization of either polarity on the input leads 74 and 75.

Thus, with respect to the offset code which is supplied from any section master to its related intersection controller, it will be noted that the code is such that of the three code wires 73–75, only one is energized at any time and its polarity of energization may be either positive or negative. This makes available six different off-shift receiver has its input lead energized and only that set conditions at each controller since only one polarity shift receiver has its input lead energized and only that particular polarity shift receiver will thus provide an output signal and only on its particular output wire corresponding to the polarity of its input signal.

Each of the separate output leads of the polarity shift receivers 70–72 is applied as one input to an "and" gating circuit. For example, output lead 76 of polarity shift receiver 70 extends to "and" gate 80, whereas output lead 77 of this same polarity shift receiver extends to "and" gate 81.

Each intersection controller includes another polarity shift receiver 82 which receives the cyclerate and synch pulses generated in the section master and applied to every intersection controller in that section. As previously described, these pulses comprise positive-going cycle rate pulses and one negative-going synch pulse for every 50 cycle rate pulses. This input is applied to polarity shift receiver 82 which functions in the same way as the polarity shift receivers 70–72 in that each positive-going cycle rate pulse provides one pulse on its output lead 83 which extends to both the signal detection circuit 84 and to the "AND" gate 85. On the other hand, each negative-going synch pulse, occurring once each cycle, produces an output only on lead 86 of the polarity shift receiver 82, and this voltage pulse on bus 86 is applied as an input to each of the "AND" gates 80, 81, etc., all associated with the polarity shift receivers 70–72, and is also applied as one input to "OR" gate 87.

Since, as previously explained, the Section Offset Generator 65 produces either positive or negative polarity on one of its output leads 73–75, and since this provides an input to one terminal of one of the "AND" gates 80, 81, etc., each arrival of the synch pulse which produces a pulse on bus 86 produces the requisite second input gating voltage to one of the "AND" gates 80, 81, etc., so that, for each such synch pulse, one of the output leads of the "AND" gates, i.e., leads 88–93, is momentarily energized.

Since each of the "AND" gate output leads 88–93 is connected to a respective one of the buses designated Nos. 1 through 6, it is evident that, dependent upon the offset code appearing on wires 73–75, a particular one of the six buses 1 through 6 will receive a pulse of energy for each synch pulse generated by synch counter 40 in the Section 3 Master 21.

A diode matrix is provided between these six buses and the various stages of the offset counter 94. The particular one of these buses which receives the pulse upon occurrence of the synch pulse determines the particular count to which the offset counter 94 is set. Thus, assuming that wire 73 was energized with negative polarity so that energy appears on wire 77 connected to polarity shift receiver 70, "AND" gate 81 will receive the two required input voltages upon the occurrence of a synch pulse which produces a voltage pulse on bus 86. As a result, bus No. 2 is energized and this causes a positive pulse of energy to be applied through diode 95 to the No. 8 lead of the decimal two's stage 96 in counter 94, through diode 97 to the No. 00 lead of the quinary ten's stage 98, and through diode 99 to the No. 50 lead of the binary fifties' stage 100 of this same offset counter 94. Consequently, under this assumed offset condition in Section 3, the offset counter 94 in the No. 8 controller is set, upon the occurrence of a synch pulse derived from synch counter 40, to count No. 58.

It will be obvious from the description thus far given that offset counter 94 also could be set to any one of its 50 different counts upon the appearance of a pulse upon bus No. 2, dependent entirely upon the connections made between that bus and the various leads extending from the several stages 96, 98, and 100 of offset counter 94. Similarly, the appearance of a pulse upon a different one of the buses Nos. 1 through 6 will set offset counter 94 to any predetermined count, dependent upon the manner in which the diodes in the matrix are connected from such energized bus to the various leads connected to the several stages of the offset counter 94.

Accordingly, dependent upon the offset control that is generated in the Section 3 Master, the No. 8 controller is required to assume a predetermined count upon the occurrence of a synch pulse when synch counter 40 is restored to its zero state. In other words, dependent upon the offset then in effect in Section 3 and the diode connections made between the offset buses and offset counter 94, any desired predetermined phase relationship may be established between offset counter 94 and synch counter 40 in the Section 3 Master. Also, it will be obvious that since each of these counters counts 50 pulses in a cycle, that a predetermined phase relationship may be established with a tolerance of plus or minus 2% of the length of complete signal cycle.

As is explained in considerable detail in the prior co-pending application of Auer and Huffman, Serial No. 239,714, filed November 22, 1962, it is not practical to control the traffic signals associated with any local signal controller directly from the offset counter since this offset counter is subject to abrupt change in the event that there is a change in offset as explained above. As is disclosed in the earlier application, this problem is solved by providing a local counter 101 which normally operates in direct phase coincidence with offset counter 94. The local counter has the same counting capacity as the offset counter and both normally operate step-by-step so that each demarcates a signal cycle. However, in the event that the offset counter 94 is abruptly shifted in phase, as by a change in offset, the local counter 101 does not immediately also change its count since, to do so, might very well increase the then-existent portion of the signal cycle or might alternatively cause one portion to be entirely skipped or unduly shortened.

Instead, a comparator 102 is provided which is responsive at all times to the then-existing counts in both the offset counter 94 and local counter 101. As long as these two counters are in exact phase correspondence, the comparator 102 causes the local counter 101 to receive input counting pulses at exactly the same rate as the offset counter 94 so that the phase coincidence of these two counters is maintained. However, in the event that phase coincidence between the two counters is lost for any reason, this condition is immediately sensed by comparator 102 which additionally determines whether local counter 101 can most quickly get back into exact phase coincidence with counter 94 by either slowing up its counting rate or by increasing its counting rate. Having determined this, comparator 102 then modifies the rate of the counting pulses appearing on bus 103 and either slightly increases or slightly decreases the rate of such pulses in rate modifier 113 so that phase coincidence between the two counters will once again be reached. The modification in the counting rate of local counter 101 is such that phase coincidence is restored in a predetermined maximum number of signal cycles irrespective of the original difference in count between offset counter 94 and local counter 101. Reference may be made to the aforementioned co-pending application Serial No. 239,714 for circuit details of apparatus which accomplishes this control of the local and offset counters, and also to a later-filed application of Auer and Huffman Serial No. 316,858, filed October 17, 1963, which also shows similar apparatus of improved form.

It is now believed expedient to describe how input pulses are provided to operate the offset counter 94 and also the local counter 101. As previously mentioned, each positive-going cycle rate pulse applied to polarity shift receiver 82 produces a voltage pulse on lead 83 which is applied as one input to "AND" gate 85. However, the pulses appearing on lead 83 are also applied to the signal detection circuit 84 which senses whether cycle rate pulses are being received at this particular local intersection controller. If cycle rate pulses are being received so that repetitive pulses appear on lead 83, a steady output voltage is produced by the signal detection circuit 84, and this output voltage acts upon the standby-coordinate switch 104, causing the latter to provide a gating voltage on wire 105 extending to "AND" gate 85. Accordingly, as long as cycle rate pulses are being received, "AND" gate 85 continually receives one of its two required inputs on lead 105 and additionally recieves a separate voltage pulse for each cycle rate pluse over lead 83. Thus, in response to each cycle rate pulse, "AND" gate 85 produces an output voltage pulse on lead 106 which is applied to "OR" gate 107. This "OR" gate 107, thus receiving at least one of its two input signals, supplies an output pulse to the pulse generator 108 for each cycle rate pulse, and successive ones of these pulses appear then on wire 103 for application directly to the offset counter 94 and indirectly to local counter 101, with the counting pulses actually applied to the latter being subject to modification by rate modifier 113 as explained previously.

If cycle rate pulses are not received for one reason or another by the No. 8 intersection controller, then no pulses appear on wire 83, and the signal detection circuit 84, after some predetermined interval wherein it fails to receive such pulses, then detects this condition and fails to provide an output to the standby-coordinates switch 104. The latter then produces an output voltage on lead 109 insead of on lead 105, as before, thereby providing one of the two inputs to "AND" gate 110. Associated with this "AND" gate 110 is the standby cycle rate generator 111 which is always in operation and provides output pulses at a fixed rate. It should be understood that this rate is not necessarily exactly the same rate that may then be generated at the central master as that rate may well be a variable one in order that the length of the signal cycle can be controlled. Nevertheless, under these conditions of failure, the standby cycle rate generator 11 does provide cycle rate pulses as a second input to "AND" gate 110 which, since it is then steadily receiving energy over 109, is then able to provide an output pulse for each pulse generated by the standby cycle rate generator 111. The resulting pulses are applied over lead 112 to "OR" gate 107. "OR" gate 107, thus having an input on one of its input leads, provides an output pulse to pulse generator 108 for each pulse generated by the standby cycle rate generator 111 so that pulses again appear on bus 103 to drive the offset counter 94 and local counter 101 despite the absence of cycle rate pulses from the Section 3 Master.

From the preceding description, it will be recalled that the establishment and maintenance of a predetermined phase relationship between the offset counter 94 at any local intersection controller such as the No. 8 controller and the synch counter 40 of the corresponding Section 3 Master is dependent upon the reception of pulses by the controller from the section master, and particularly the reception of synch pulses since these, in effect, provide data as to the phase of the synch counter 40 and provide the second required input signal to a selected one of the "AND" gates 80, 81, etc. in the controller. In the event that there is a failure in the transmission of pulses from the section master to a related controller, this is recognized by that controller and, as above described, an output voltage then appears on wire 109 extending from standby-coordinate switch 104. As soon as the voltage appears on wire 109, a charging of capacitor 115 occurs, thereby producing a momentary voltage pulse on bus 116. The appearance of a voltage pulse on bus 116 produces an effect comparable to that occurring when a synch pulse produces a pulse on any one of the buses Nos. 1 through 6 in that the offset counter 94 is then set to some predetermined count dependent upon the diode connections made between the standby offset bus 116 and the several leads extending from the various stages of offset counter 94. With the assumed diode matrix connections shown in FIG. 2D, it is evident that the pulse on bus 116 will set offset counter to a count of 06.

Of course, if such a "standby offset" is to have any value and thus be preferable to merely having each controller operate at random with its offset at any random amount relative to the synch counter 40 in the Section 3 Master, it is important that all the controllers associated with any section master operate to predetermined relative phase relationships when the section maser fails to transmit pulses to its related controllers. This is effected in the present system by providing a signal detection circuit 84 in each local intersection controller having an effective time constant which is as closely as possible the same for each controller. Therefore, in the event that the section master fails to generate the cycle rate pulses, each signal detection circuit 84 in each of the respective controllers associated with that section master will detect this condition at almost exactly the same time. Therefore, at each of the intersection controllers, a pulse will appear on its bus 116 at about the same time and set its offset counter 94 to its predetermined count as determined by the diode matrix connecting bus 116 to the various offset counter stages. In each of the controllers, the diode pin connectors may be so set that some predetermined progression may be established for standby purposes which, although not necessarily the otpimum which might then be determined by the offset generator 65, will nevertheless provide a progression from one signal location to the next which will better facilitate the flow of traffic than would be the case if every controller were operating at a random phase relationship to all other controllers in that section.

It will additionally be noted that the pulse appearing on bus 116 appears only at the instant that the signal detection circuit 84 first operates switch 104 to the standby condition, thereby placing energy on bus 109. It is this initial pulse which appears on bus 116 as capacitor 115 charges that establishes the standby offset; in other words, there is no recurrent check made each cycle to determine that the offset counter 94 at each controller is at a predetermined count. This, of course, results from the absence of synch pulses which ordinarily provide this function; nevertheless, under such emergency conditions, which are not expected to prevail for protracted periods of time, it is expected too that the several controllers of a section will tend to maintain at least approximately the predetermined relative phase relationships of their offset counters that were initially established upon detecion of the failure to receive the necessary pulses.

There is one other circumstance under which a standby offset should be put into effect. That is the circumstance under which offset information is not being received by any controller from the associated section master. Thus, assuming that no energy appears on any of the wires 73–75 extending from the Section 3 Master to the No. 8 controller, none of the polarity shift receivers 70–72 will then provide energy on any of its output leads, and thus no input will be applied to the "NOR" gate 130. Because of this, the "NOR" gate will then produce an output signal which is applied to the "AND" gate 131. Each occurrence thereafter of a synch pulse producing a pulse on bus 86 then provides the required second input to this "AND" gate 131, thereby also providing a pulse on the standby offset bus 116 which again operates the offset counter 94 to the particular count predetermined by the diode connections made between bus 116 and the various counter stages of counter 94.

From the description given in the previously mentioned co-pending application of Auer and Huffman, Serial No. 239,714, it will be apparent how the local counter 101 may be used to control the signal control apparatus 132. Thus, the decimal two's stage 133, the quinary ten's stage 134, and the binary fifties' stage 135 will, collectively, assume a different combination of energization of their respective output leads for each of the 50 counts constituting a signal cycle. Appropriate diode connections may be made in the matrix formed by these output leads and the several input leads to the signal control apparatus 132 so that the signal cycle may be started at any predetermined count of local counter 101. Also, the split of the cycle may similarly be determined.

For example, a diode 136 is connected between the 0 output lead of the decimal two's lead 133 to bus 137, a similar diode 138 is connected from the 00 lead of the quinary ten's stage 134 to bus 139, and a similar diode 140 is connected from the 00 lead of the binary fifties' lead 135 to bus 141. This arrangement then provides that the signal control apparatus 132 will receive energization on each of its three wires 137, 139, and 141 every time that local counter 101 has completed a counting cycle and returned to its 00 state. Appropriate "AND" gating circuitry may be employed in the signal control apparatus 132 to indicate that at such instant the preceding signal cycle shall be terminated and a new signal cycle begun. It will be apparent from the description given thus far that the diode connections made between the several stages of local counter 101 and buses 142, 143, and 144 will provide energy simultaneously on these latter wires when the local counter 101 reaches the count of 72. This means that at the 72% point in the signal cycle, the cycle split will be effected. It is clear to one skilled in the art that any even-numbered percentage point from zero to 100% may be selected for the desired point of cycle split of the signal cycle and also that the signal cycle may be started at any desired count as well and need not necessarily start on the 00 count of local counter 101.

Having now described how any one local intersection controller is operated by its section master, a description will now be presented of the manner in which a proper relationship in offsets is maintained between local intersection controllers which are adjoining even though each is associated with a different section master. The problem, as previously mentioned, arises because each section master determines its own most expedient offset and may shift from one offset condition to another irrespective of what is taking place with respect to offset in the adjoining section.

Referring to FIG. 2C, it will be noted that the local intersection controller shown there is identical to that shown in FIG. 2D, the No. 8 controller. However, the No. 7 controller is controlled from the Section 2 Master 14 of FIG. 2A, whereas the No. 8 controller is controlled from the Section 3 Master of FIG. 2B, all as shown also in FIGS. 1A and 1B.

From the detailed description given thus far with respect to the No. 8 controller, it will be apparent that the count which is assumed by the offset counter 94 of the No. 7 controller at the time of a synch pulse received from the Section 2 Master is dependent entirely upon which of the numerous available offsets Nos. 1 through 6 is then in effect throughout all of Section 2. As one example, if the No. 1 offset is in effect, it is evident from the manner in which the diode connections are arranged to the offset counter 94 in FIG. 2C that, upon the occurrence of a synch pulse from the Section 2 Master, the offset counter will be operated to the count of 36, whereas if the No. 5 offset is then in effect, the occurrence of a synch pulse provided by the Section 2 Master will ensure that offset counter 94 in FIG. 2C will then be operated to count 90.

If the offset between the No. 7 and No. 8 controllers is not to be disturbed by the occurrence of a change of offset in Section 2, it is evident that there must be a shift in all of the signal cycles being demarcated throughout Section 3, including the signal cycle demarcated by the synch counter 40 in the Section 3 Master which, in turn, then shifts all the signal cycles demarcated by the offset counters 94 of the various local intersection controllers associated with Section 3. This is most conveniently accomplished by arranging the diode matrix associated with synch counter 40 in the Section 3 Master so that it is identical to that which controls the setting of offset counter 94 in the No. 7 controller. Of course, it will be remembered that the type of counter used in the local intersection controller, being of an entirely solid-state nature, is of a different type than that used in a section master so that the particular manner of effecting the connections in the diode matrix may be somewhat different. However, it will be noted that any predetermined offset which sets counter 94 in the No. 7 controlled to some predetermined count will also set synch counter 40 in the Section 3 master to exactly the same count.

More specifically, assume that offset 2 is in effect throughout all of Section 2. This means that a pulse of positive energy appears on bus No. 2 in the diode matrix of the No. 7 controller for each synch pulse produced by the synch counter 40 of the Section 2 Master. From the connections shown in FIG. 2C, it is evident that this re-setting pulse appearing on bus No. 2 will set offset counter 94 to the count of 44. Referring now to FIGS. 2A and 2B, it is evident that the energization of bus No. 2 in the diode matrix associated with synch counter 40 in the Section 3 Master will likewise set synch counter 40 to a count of 44. More specifically, diode 150 permits the negative energy pulse to be applied to the No. 4 lead of the cyclic ten's counter 42 and at the same time diode 151 permits the same negative pulse of energy on bus No. 2 to be applied to lead No. 4 of the unit counter 41 so that the synch counter 40 as a whole, will be set to counter 44.

The vairous phase relationships and the manner in which they are obtained can best be illustrated by referring to FIG. 4. Line A of FIG. 4 shows the successive signal cycles which are demarcated at the central master. It will be appreciated that the drammatic showing of a signal cycle has been made in the manner shown merely for the purposes of convenience and that each signal cycle comprises a repetitive number of code pulses as is more particularly illustrated in FIG. 5.

With respect to Section 2 which is directly slaved to the central master, its synch mounter 40 may be placed in direct phase relationship with the counter in the central master, and this is shown in FIG. 4 at line B, which shows that each signal cycle in the Section 2 Master is in direct phase coincidence with the equal length cycles of the central master.

Line C, D, E, F, and G illustrate various phase relationships which exist when one of the available offsets is under the assumption that there is one in effect throughout Section 2; whereas lines H, I, J, K, and L of the same FIG. 4 assume that the offset in Section 2 has been changed to meet a different set of traffic conditions.

Line C shows the particular offset that exists between the offset counter 94 of the No. 7 controller relative to the master cycle demarcated by synch counter 40 of the Section 2 Master. Line D shows that the master cycle demarcated by the synch counter 40 of the No. 3 Section Master is in direct phase correspondence with that of offset counter 94 in the No. 7 controller, and this comes about, as previously explained, because the diode matrix controlling synch counter 40 is arranged to set this synch counter into phase coincidence with the offset counter 94 in the No. 7 controller irrespective of the offset then in effect in Section 2.

Line E shows the signal cycle of the No. 8 controller as being phase displaced relative to the Section 3 Master cycle by an assumed amount, and line F shows a further phase displacement of the signal cycle as demarcated by the offset counter at the No. 10 controller which is the last controller of Section 3 as shown in FIGS. 1A and 1B.

Recognizing again that the No. 10 controller is the last controller in Section 3, line G shows that the signal cycle demarcated by the synch counter of the No. 4 Section Master is again in direct phase coincidence with the signal cycle demarcated in the No. 10 controller.

As mentioned previously, Lines H–L of FIG. 4 assume that a different offset has been put into effect throughout Section 2, and this is shown by the smaller phase displacement between the signal cycle demarcated by the No. 7 controller (line H) relative to the signal cycle demarcated by this same No. 7 controller at line C. Since the information with respect to the change in offset is communicated not only to the No. 7 controller, thereby effecting the offset change shown at line H, but is also transmitted to the Section 3 Master, a change in count is effected in the synch counter 40 of the Section 3 Master upon the very next occurrence of a reference synch pulse from the Section 2 Master, and this brings the signal cycle demarcated by the synch counter 40 of the Section 3 Master once again directly into correspondence with that which is demarcated by the offset counter of the No. 7 controller as represented at line I which shows a direct phase correspondence with line H in FIG. 4.

Line J shows the signal cycle demarcated at the No. 8 controller and its phase relationship relative to the signal cycle demarcated by the Section 3 synch counter 40 remains the same as before as can be noted by comparing lines D and E of this same FIG. 4. In other words, since it is assumed that there has been no change in offset in Section 3, only in Section 2, the signal cycle of the No. 8 controller has the same phase relationship as it did before with respect to the signal cycle demarcated by the synch counter in the Section 3 Master even though the entire signal cycle of both the Section 3 Master and the No. 8 controller, as well as all the other controllers in Section 3, has been displaced in time to account for the time shift in the signal cycle of the No. 7 controller. Also, the fact that there was a change in offset in Section 2 but not in Section 3 is shown again at line L as having had no effect upon the relative phase relationships between the signal cycles demarcated at the No. 8 and No. 10 controllers since the relative phase relationships shown at lines J and K are exactly those which are shown at lines E and F.

However, again assuming that the No. 10 controller is the last controller in Section 3, and is the one most closely adjoining Section 4, and further assuming that Section 4 is, in effect, slaved to Section 3 (see FIGS. 1A and 1B), line L shows that the signal cycle demarcated by the synch counter 40 of the Section 4 Master is brought into direct phase correspondence with that demarcated by the No. 10 controller in its offset counter.

With this understanding of the system in mind, one can now appreciate that a certain simplicity in operation of the system may be achieved. As previously mentioned, often the most feasible arrangement is to slave to the central master that particular section master which is geographically most closely adjacent the central master and thereafter to slave each of the section masters in turn "outwardly" from that particular pre-selected section master. If now, referring to FIGS. 1A and 1B, the No. 5 local intersection controller has its diode matrix with respect to its offset counter 94 so arranged that, regardless of which offset is in effect in Section 2, its offset counter will always be set to the zero count by a synch pulse, then it will be apparent that any change in offset that may be experienced in Section 2 will not have any re-setting effect upon offset counter 94 since any occurrence of a synch pulse, regardless of which offset is in effect, will always require that this offset counter be in the 00 state.

Remembering, in addition, that the Section 1 Master will, in accordance with the offset data it receives from the Section 2 Master, be set to a count upon the occurrence of the reference synch pulse from Section 2 in correspondence with whatever count is then registered by the offset counter of the local controller No. 5, it will now be further apparent that any change in offset in Section 2 will not affect at all the synch counter of the Section 1 Master since there will be no change in phase experienced by the offset counter of Section 2. Consequently, there also will not be any effect upon any of the offset counters in any of the local intersection controllers which are included in Section 1.

This particular feature of the invention is best illustrated in FIG. 6 which is a partial diagram of the No. 7 local intersection controller showing only the offset counter 94 and its diode matrix and showing that, regardless of which of the offset buses Nos. 1 through 6 is energized, the offset counter 94 is set to its 00 count.

An additional feature of this invention is that concerning the connection of output lead 109 of standby-coordinate switch 104 in a controller such as the No. 8 controller (FIG. 2D) to each of the polarity shift receivers 70, 71 and 72 and also to the polarity shift receiver 82. As described previously, energy appears on wire 109 whenever the signal detection circuit 84 has detected an absence of cycle rate pulses for some predetermined minimum period of time. The application of this voltage on wire 109 to each of the polarity shift receivers 70–72 is for the purpose of inhibiting operation of these polarity shift receivers so that none can provide an output to one of the "AND" gating circuits 80, 81, etc.

The voltage on wire 109 is also supplied to polarity shift receiver to inhibit its synch pulse responsive portion while still enabling it to respond to synch rate pulses so that the system is free to go back to normal operation in the event that cycle rate pulses are again received. Such inhibiting action, in the absence of cycle rate pulses, is desirable in order to prevent extraneous resetting pulses appearing on one of the busses Nos. 1–6 associated with the diode matrix for offset counter 94. More specifically, if cycle rate pulses are not present, offset counter 94 is then operating in response to the pulses generated locally by the standby cycle rate generator 111, and since its rate cannot be expected to be identical with that of the pulses provided by the central master, it is undesirable to permit the offset counter to be re-set in response to synch pulses which might still be received, since the controller was operated to the standby offset mode when the absence of cycle rate pulses was first detected in the manner previously described.

The solid-state counters which are used for the offset counter 94 in each of the local intersections controllers may comprise a plurality of transistors in each stage and with the particular transistor which is conductive in each stage indicating the count registered therein. The associated diode matrix, by means of which a pulse is effective to set the offset counter 94 to any predetermined count, in actual practice applies a gating voltage to select those counter stages which are desired to be operated to their "ONE" condition. However, if at the time of such re-setting, the offset counter 94 is then registering some other count so that other stages of the offset counter 94 are then in the "ONE" condition. It is obviously necessary that the counter be instantaneously re-set to a zero count, i.e., with all its stages in the "ZERO" condition immediately before a re-setting pulse is applied. This is accomplished by providing a re-setting pulse on bus 160 to both the decimal two's stage 96, the quinary ten's stage 98, and the binary fifties' stage 100, all included in offset counter 94. More particularly, assuming that the system is operating in a normal mode so that cycle rate and synch pulses are received by polarity shift receiver 82, a pulse appears on bus 86 for each synch pulse, and this is applied to "OR" gate 87 which then produces an immediate charging of capacitor 161 with a resulting voltage pulse appearing on bus 160 which then re-sets each of the aforementioned counter stages. Incidentally, it should be noted that this re-setting occurs upon the very leading edge of the synch pulse since it is the leading edge of the synch pulse which charges capacitor 161 and therefore re-sets these counters. The remainder of the synch pulse which endures beyond the charging of capacitor 161 and the resulting re-setting pulse, is effective to place a counter-setting pulse on one of the buses designated Nos. 1 through 6 and thus is capable of re-setting the offset counter 94 to any one of its predetermined 50 different counts.

It may also be, as previously described, that the polarity shift receiver 82 fails to receive cycle rate pulses from the Section 3 Master. In that event, the standby-coordinate switch 104 produces an output on bus 109, and this then provides an alternate input to "OR" gate 87 so that once again a momentary charging of capacitor 161 occurs which, in turn, produces a re-setting pulse on bus 160 that re-sets the entire offset counter 94 to a condition wherein none of the transistors included in the various stages are conductive. In effect, then, this preconditions the offset counter so that it can be re-set to its standby offset in the manner already described.

In the circuits shown in FIGS. 2A–2D, most of the elements of the invention have been shown in block form, and this has been done to facilitate the disclosure, since it is well known to one skilled in the art how to construct the various elements thus shown diagrammatically. For example, pulse counters, pulse generators, "AND" gates, "OR" gates, etc. are all familiar to one skilled in the art and thus need not be shown in detail. With respect to the polarity shift receivers 70–72 and 84, which are not shown in block diagram in FIG. 2D, reference may be made to a prior co-pending application of Huffman and Auer, Serial No. 377,455, filed January 13, 1964 which discloses in detail the construction and mode of operation of such receivers.

It will be evident to one skilled in the art that the system disclosed herein is not limited to one involving a continuous artery, divided into a plurality of adjoining sections and with the successive signal cycles so phase related between adjoining sections, despite changes in offset, that there will be no discontinuity for vehicles traveling from one section to the next. For example, the principles of this invention are equally applicable to signalling systems involving non-intersecting arteries where it is desired to maintain some predetermined phase relationship between the successive signal cycles for the respective arteries. It is also evident that the invention is applicable to a system whereby the respective sections, one of which is effectively phase related to the other, comprise the signalling systems for intersecting streets since the application of the principles of this invention to such a system makes it possible to phase shift the signal cycles for all the traffic signals of one artery in response to a change in offset on an intersecting artery, thereby making it possible to maintain optimum operating conditions at the intersection.

Having described an improved traffic signal control system of the type in which a large number of intersections along an artery are controlled by traffic signals and with the signals divided into separate sections which are, to at least a certain extent, capable of independent control, we desire it to be understood that various modifications and alterations may be made to the specific form of our invention shown without departing in any manner from the spirit or scope of our invention.

What we claim is:

1. In a control system for traffic moving along a plurality of successive route sections, a first plurality of traffic signals governing traffic moving along a first route section, a second plurality of traffic signals governing traffic moving along a second route section, first control means for each traffic signal for demarcating a signal cycle of predetermined duration at any given time, second control means for at times shifting the time phase of the successive signal cycles demarcated by the respective control means for at least one of said traffic signals of said first plurality relative to that of any other of said first plurality of traffic signals, and third control means for maintaining a predetermined phase relationship between the signal cycles demarcated by the said first control means for a selected one of said second plurality of traffic signals and the signal cycles demarcated by said first control means for said one of said first plurality of traffic signals in response to said shifts in phase produced by said second means.

2. The traffic control system of claim 1 wherein said first and second route sections adjoin each other to form a continuous artery and said one traffic signal of said first plurality and said selected traffic signal of said second plurality constitute the successive signals encountered by a vehicle exiting one of said route sections and entering the other of said route sections.

3. The traffic control system of claim 1 wherein said second control means comprises offset control means operatively connected to said first control means for at times adjusting the relative phase relationships of said signal cycles demarcated respectively by said controller means for said first plurality of traffic signals.

4. The traffic control system of claim 1 wherein said second control means maintains said predetermined first relationship by adjusting the phase of the successive signal cycles demarcated by said control means for each traffic signal of said second plurality in the same direction and by the same amount as the signal cycle of said one traffic signal of said first plurality.

5. In a traffic control system, a first plurality of traffic signals governing traffic moving along a first route section, a second plurality of traffic signals governing traffic moving along a second route section, control means for each traffic signal for demarcating a signal cycle of predetermined duration at any given time, offset control means for said first plurality of traffic signals for at times adjusting the relative phase relationships among the signal cycles demarcated by the respective control means for said traffic signals of said first plurality, means for maintaining a predetermined phase relationship between the signal cycles demarcated by the control means for a selected one of said second plurality of traffic signals and the signal cycles demarcated by said control means for a selected one of said first plurality of traffic signals in response to changes in offset produced by said offset control means, and means associated with each said traffic signal for operating such signal through a series of traffic-governing indications on each signal cycle demarcated for such signal.

6. In a traffic signal control system, a first group of traffic signals encountered in succession by vehicles traveling along a first predetermined route section, a second group of traffic signals encountered in succession by vehicles traveling along a second route section, said first and second route sections intersecting, controller means for each said traffic signal demarcating a signal cycle of the same duration at any given time and operating the associated signal through a series of traffic-governing indications during such signal cycle, offset control means for at least one of said sections being operable to a plurality of different offset conditions, means responsive to said offset control means for governing the plurality of controller means of said one section to provide different relative time phase relationships for the respective signal cycles demarcated by the successive controllers of said one section in accordance with the then-existing offset condition of said offset control means, section master means for each of said route sections, said section master means for the other of said sections including control means also responsive to the offset control means of said one section for time shifting the signal cycles respectively demarcated by all said controllers of the other said section by an equal amount and in the same phase change of direction upon a change in offset condition of said offset control means to maintain a predetermined phase relationship between the signal cycles demarcated respectively by a selected controller of said first section and a selected controller of said second section despite a time shift in the signal cycle demarcated by said selected controller of said first section in response to said offset change.

7. The traffic control system of claim 6 wherein said selected controller of said first section and said selected controller of said second section are respectively the controllers for the endmost traffic signals of the respective adjoining ends of said intersecting route sections.

8. The traffic control system of claim 6 wherein said section master control means includes phase shiftable means also demarcating said signal cycle of said same duration and each said controller means of said other section includes means for establishing the phase relationship between the signal cycles it demarcates and the signal cycles then demarcated by said phase shiftable means, said phase shiftable means being responsive to said offset control means of said first section for shifting the phase of the signal cycle demarcated by said phase shiftable means in response to a change in said offset control means from one offset condition to another.

9. A traffic control system for succesive adjoining sections along an artery each including a plurality of traffic signals for the respective intersections of cross-streets with said artery, a controller operating each traffic signal through a sequence of indications on each signal cycle, means common to and operatively connected to all said traffic signal controllers to control each to demarcate at any given time a traffic signal cycle of a predetermined duration, section master means for each section including offset control means operating on said traffic signal controllers for that section to variably adjust the relative time phase relationships of the signal cycles demarcated respectively by the plurality of controllers included in said section in order to put into effect at any time one of a plurality of different offsets for said respective section, each said section having means controlled by a shift in the time phase by a given amount of the traffic signal cycle demarcated by another traffic signal controller included in another section for controlling said section master means to shift the time phase of all the signal cycles demarcated by the controllers of said section by said given amount and in a direction corresponding to that experienced by said another traffic signal controller.

10. The traffic control system of claim 9 wherein said another traffic signal controller is that signal controller which is nearest to said respective section but in an immediately adjoining section.

11. The traffic control system of claim 9 wherein said section master means includes cycle demarcating means responsive to said common means for also demarcating a signal cycle of said predetermined duration, said offset control means variably adjusting the time phase relationship of the signal cycle demarcated by each controller in the respective section relative to that demarcated by said section master cycle demarcating means, said operative means at times shifting the time phase of said signal cycle demarcated by said section master cycle demarcating means in response to a shift of phase of said traffic signal cycle demarcated by said another controller.

12. A traffic control system for an artery divided into a plurality of successive route segments each constituting an individual section and each including a plurality of successive traffic signals, section master means for each said section including means for demarcating successive signal cycles each of a predetermined uniform duration for each said section at any given time, means coupling each said cycle demarcating means to each traffic signal of the corresponding section for demarcating a signal cycle for each traffic signal of said coresponding section and for operating each such traffic signal through a series of traffic-governing signal indications on each signal cycle, each said section master means also including offset control means operable to different conditions and acting on said coupling means to differently adjust the relative phase relationships among the successive signal cycles demarcated for the respective traffic signals of said section according to the operated condition of said offset control means, one of said section masters associated with a selected section having its cycle demarcating means operating independently of any other section master means, and means connected between said selected section master means and the adjacent section master means associated respectively with the sections immediately adjacent the respective ends of said selected section for maintaining a predetermined phase relationship between the succesive signal cycles demarcated by said cycle demarcating means of either said adjacent section master means and the successive signal cycles demarcated by said coupling means of said one section master for the particular endmost traffic signal of said one section at the end thereof nearest said adjacent section after any changes in offset for the traffic signals of said one section.

13. The traffic control system of claim 12 which includes at least one further section adjoining one of said adjacent sections and extending further outwardly from said one adjacent section, and means connected between said section master means of said further section and said section master means of said one adjacent section for maintaining a predetermined phase relationship between the successive signal cycles demarcated by said cycle demarcating means of said further section and the successive signal cycles demarcated by said coupling means of said one adjacent section for the particular endmost controller of said one adjacent section nearest pair further section in response to changes in offset for the traffic signals of either said one section or said one adjacent section.

14. The traffic control system of claim 12 wherein said connecting means maintains synchronism between the successive signal cycles demarcated by the cycle demarcating means of said further section and the successive signal cycles demarcated for said particular endmost traffic signal of said one adjacent section.

15. The traffic control system of claim 12 wherein said offset control means for each section adjusts the relative phase relationship among the successive signal cycles demarcated for the respective traffic signals of the associated section by controlling the phase of the successive signal cycles for each said respective traffic signal relative to successive signal cycles demarcated by the cycle demarcating means of the associated section master means.

16. A traffic control system for an artery divided into a plurality of successive route segments each constituting an individual section and each including a multiplicity of successive traffic signals, apparatus for each section including master digital counting means demarcating successive signal cycles each of a predetermined uniform duration for all of said sections at any given time, means for each section responsive to said master digital counting means of said section for demarcating successive signal cycles for each traffic signal of said section and with the successive signal cycles for any particular traffic signal bearing a predetermined but adjustable phase relationship relative to the signal cycle demarcated by said master digital counting means, offset control means for each section for adjusting the phase of the successive signal cycles for each traffic signal relative to the successive signal cycles demarcated by said master digital counting means for said section, and means coupling said master digital counting means and offset control means of one section to the master digital counting means of an adjacent section, said coupling means operating said master digital counting means of said adjacent section at all times with a phase relationship providing successive signal cycles which are in phase synchronism with the successive signal cycles demarcated for the adjacent endmost traffic signal of said one section.

17. The traffic control system of claim 16 wherein means common to the entire system demarcates successive signal cycles of said predetermined duration, and further means couples said common means to said master digital counting means of only one of said sections.

18. The traffic control system of claim 16 wherein said responsive means includes a further digital counting means for each traffic signal of said section, and multiple input control means for each said further digital counting means is operatively connected to said offset control means for adjusting the phase of each said further digital counting means relative to said master digital counting means, said master digital counting means of said adjacent section also including multiple input control means responsive to said offset control means of said one section.

19. The traffic control system of claim 18 wherein signal control means is coupled between each said further digital counting means and its associated traffic signal, said signal control means operating said traffic signal from one traffic-governing indication to the next upon the attainment of a predetermined count by said further digital counting means.

References Cited by the Examiner

UNITED STATES PATENTS 3,120,651 2/1964 Hendricks ------------ 340—35

NEIL C. READ, *Primary Examiner.*

THOMAS B. HABECKER, *Examiner.*